Jan. 27, 1953     A. P. MANSOFF     2,626,971
BATTERY HEATER
Filed March 23, 1950     2 SHEETS—SHEET 1
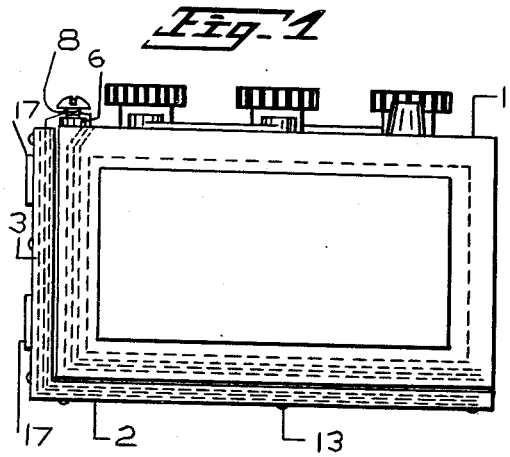
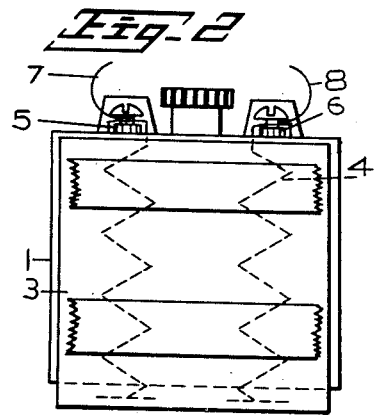
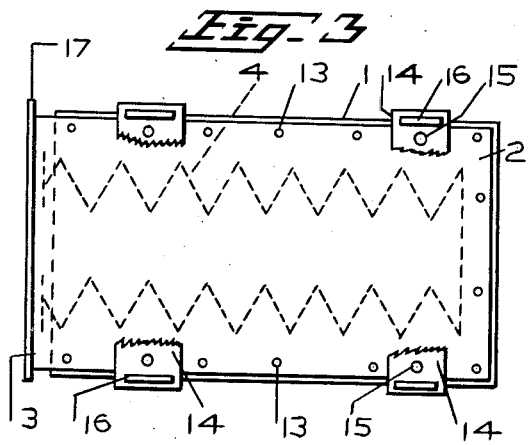
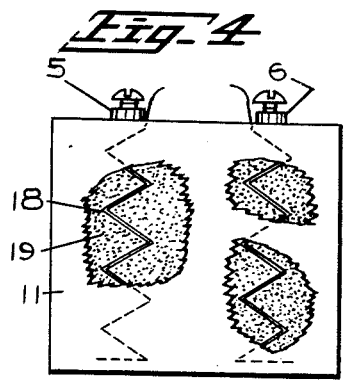
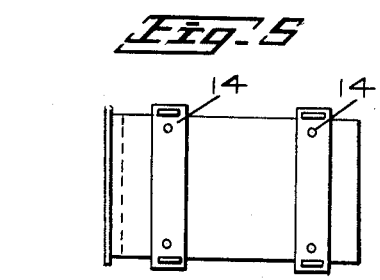
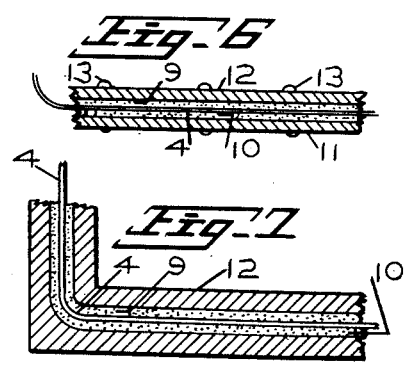
Inventor
Arthur Percival Mansoff
Per L. S. Mitchell
Attorney Jan. 27, 1953        A. P. MANSOFF        2,626,971
BATTERY HEATER
Filed March 23, 1950        2 SHEETS—SHEET 2
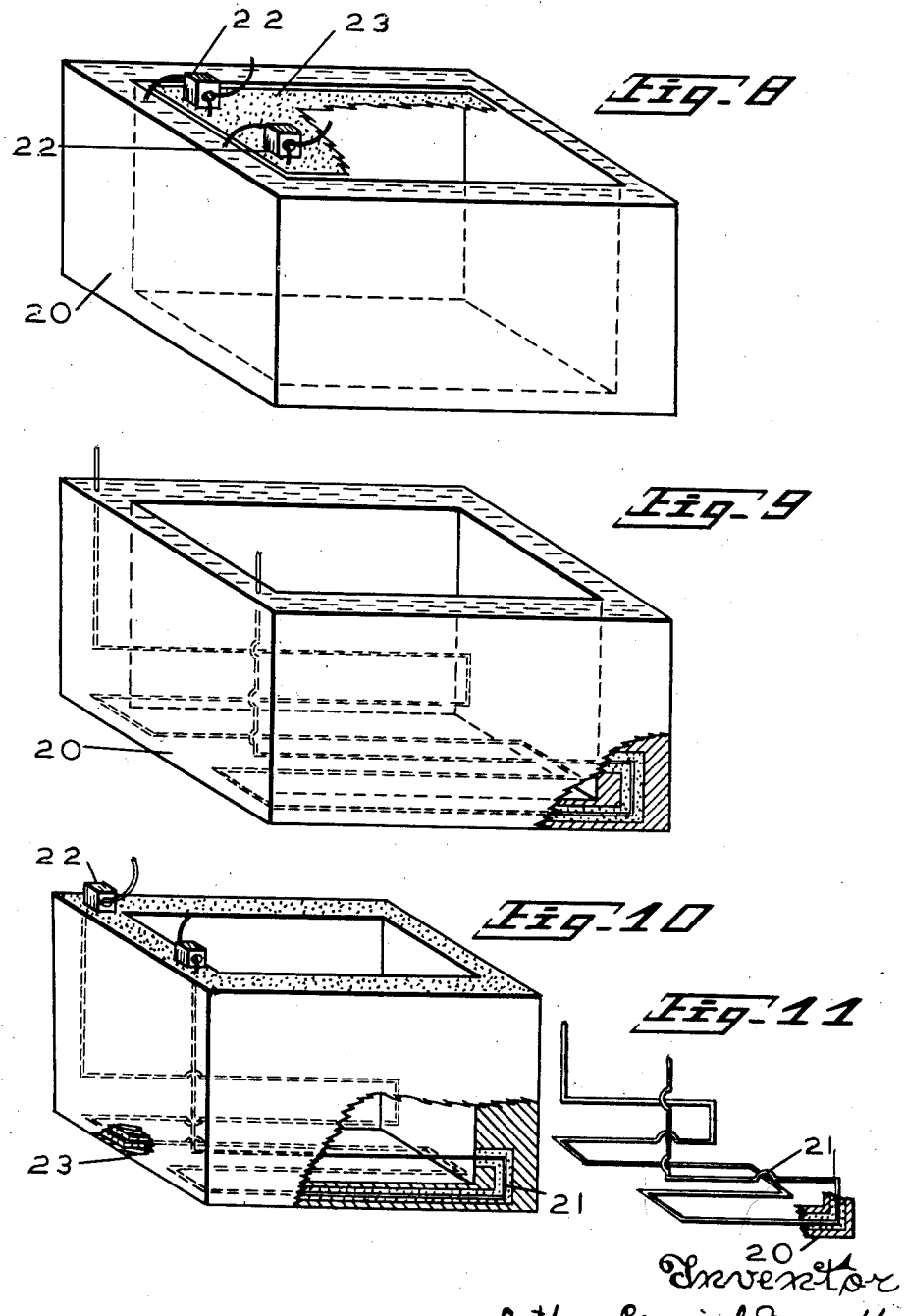

Patented Jan. 27, 1953

2,626,971

UNITED STATES PATENT OFFICE 2,626,971

BATTERY HEATER

Arthur Percival Mansoff, Dauphin, Manitoba, Canada, assignor to Osborne C. Steele, Kelowna, British Columbia, Canada Application March 23, 1950, Serial No. 151,373

1 Claim. (Cl. 136—161)

My invention relates to motor vehicle battery heaters, having reference to the application of a heating element to a battery, either incorporated in the battery casing walls or as a separate attachable device.

In the art to which the invention relates motor batteries weaken considerably when subjected to extreme cold, and after use of a starter may have insufficient strength to provide the needed spark for the motor, particularly as the mixture would be cold and weak. When very cold the electrolite stiffens and gets so thick it will not feed to the plates fast enough to create the starting power and the voltage for the spark at the same time.

The present invention contemplates provision of heating means for the battery connectable to a source of power of the required voltage by which a mild heat may be applied when required, with resulting increased strength to the battery in cold weather and stronger spark to more effectively ignite a weak mixture.

One of the objects of the invention is accordingly to provide heating means for a motor vehicle battery to be controlled from the dash board of the vehicle.

A further object of the invention is to provide such heating means adapted for incorporation in the battery walls, or as an externally applied jacket or casing adapted for mounting the battery therein.

Other features and advantages of the invention will become apparent by reference to the accompanying description taken in conjunction with the drawings wherein like characters of reference indicate like parts throughout the several views and wherein:

Fig. 1 is a side view of a battery shown as with the separate heating device attachable thereon.

Fig. 2 shows an end view of a battery with a separate heating jacket attached thereto.

Fig. 3 shows an inverted plan view of the battery with separate heating jacket, the latter being shown partly broken away.

Fig. 4 shows an end view partly broken away of a battery with heating element incorporated in the wall of the battery.

Fig. 5 shows an inverted plan view of the separate heating jacket, and including the metal strips for attachment of fastening means by which the jacket may be attached on a battery.

Fig. 6 shows a fragment in section of the heating jacket.

Fig. 7 shows a detail fragment in section of a heating jacket.

Fig. 8 shows a top perspective of a heated casing with battery indicated therein, and in which the heating elements would be imbedded in the casing walls.

Fig. 9 shows a perspective view of the heated casing taken by itself and shown partly broken away to disclose the heating element.

Fig. 10 shows a perspective view of a battery shell with the heating element imbedded therein.

Fig. 11 shows a diagram of the heating elements and including a fragment of the casing.

Having reference to the drawings, more particularly Figures 1 to 7, I indicates a battery of a type in common use for motor vehicles and to which the heating attachment forming the subject matter of the present invention is to be applied, or in the walls of which heating elements may be imbedded.

The removable heating attachment is preferably formed to provide a bottom 2 and end wall 3 right angular thereto and adapted to be applied as a jacket to cover the bottom and one wall of the battery. Within the unit so formed would be mounted wiring 4 of sufficient resistance to provide a mild heat, this wiring preferably being applied as in Figures 2, 3 and 4 to have increased heating capacity over a greater area. The battery provides terminals at 5 and 6 to which the wiring 4 is connected, to provide the necessary power or to be carried to a suitable source of power. Said wiring further would include leads 7 and 8 to be extended to a switch mounted on the vehicle dash.

The wiring 3 is interposed between insulating layers 9 and 10 on the outside of which is a leather facing 11, and on the inside a similar facing 12, the whole being secured together by rivets 13 at intervals along the marginal portions of the jacket.

For attachment of the jacket I provide metal strips 14—14 on the bottom spaced apart and secured by rivets 15, each of said strips having slots 16 at the ends for engagement of leather straps or the like by which the jacket may be strapped to the battery. Similarly the end wall of the jacket is provided with strips 17 for attachment to the battery.

The removable jacket is designed for application to batteries as at present in use, it being understood that in the manufacture of new batteries the heating element may be moulded in the battery wall, as more clearly shown in Figure 4. In this, heating elements 18 are incorporated in the walls of the battery between insulating layers, as at 19, these heating elements having the lengthened zig zag formation as in the removable jacket, and similarly applying to one or more walls of the battery.

In the showing in Figures 8 to 11 there may be provided heating elements imbedded in a casing adapted to contain a battery, as in Figures 8 and 9, or the elements imbedded in the battery shell, as in Figure 10.

For this, Figures 8 and 9, a rectangular casing 20 is provided adapted to receive a battery therein, the casing having imbedded in the bottom and side walls an insulated heating element 21 connecting to battery posts 22. This element preferably follows the design indicated in Figure 11, but may take any preferred form, and may, as in Figure 10, be incorporated in the wall of the battery 23.

Heat is applied to the lower part of the battery sufficient to warm the battery to a temperature at which it can deliver the full starting load.

While I have herein disclosed a preferred embodiment of my invention, changes are conceivable and in so far as these come within the spirit and scope of the invention as defined in the appended claim they would be considered a part hereof.

I claim:

Heating means for a motor vehicle battery, said battery including a casing, and said means comprising a heating element embodied in a wall of the casing and the bottom thereof, a jacket attachable on the casing and adapted to overlie the wall and bottom of the casing with the heating element therein, a further heating element in the jacket in opposing relation to the heating element of the side and bottom of the battery casing, and terminals on the battery casing to which the heating elements connect and including leads to said terminals connectable to a source of power.

ARTHUR PERCIVAL MANSOFF.

REFERENCES CITED

The following references are of record in the file of this patent:

UNITED STATES PATENTS

| Number | Name | Date |
|---|---|---|
| 1,236,440 | Humitsch | Aug. 14, 1917 |
| 1,266,780 | Edison | May 21, 1918 |
| 1,361,533 | Newell, Jr., | Dec. 7, 1920 |
| 1,455,287 | Hadley | May 15, 1923 |
| 1,687,196 | Daellenbach | Oct. 9, 1928 |
| 2,028,347 | Pelosi | Jan. 21, 1936 |
| 2,291,548 | Gilman | July 28, 1942 |
| 2,406,367 | Griffith | Aug. 27, 1946 |
| 2,418,792 | Riggs | Apr. 8, 1947 |
| 2,516,048 | Endress | July 18, 1950 |
| 2,516,637 | McCollum | July 25, 1950 |

FOREIGN PATENTS

| Number | Country | Date |
|---|---|---|
| 57,725 | Norway | Mar. 15, 1937 |
| 62,194 | Norway | Mar. 18, 1940 |

OTHER REFERENCES

Modern Plastics, Feb. 1944, page 114.